United States Patent [19]
Björnsson

[11] Patent Number: 5,484,523
[45] Date of Patent: Jan. 16, 1996

[54] ARRANGEMENT FOR A FILTER FOR THE PURIFICATION OF OIL

[76] Inventor: Aegir Björnsson, Vallgatan 17, Smögen, Sweden, S-450 43

[21] Appl. No.: 133,158

[22] PCT Filed: Apr. 15, 1991

[86] PCT No.: PCT/SE91/00266

§ 371 Date: Oct. 14, 1993

§ 102(e) Date: Oct. 14, 1993

[87] PCT Pub. No.: WO92/18219

PCT Pub. Date: Oct. 29, 1992

[51] Int. Cl.$^6$ .................................. B01D 35/147
[52] U.S. Cl. .................. 210/130; 210/149; 210/430; 210/440; 210/442; 210/484; 210/497.1
[58] Field of Search .................. 210/130, 137, 210/149, 437, 440–442, 430, 457, 497.1, 484, DIG. 13

[56] References Cited

U.S. PATENT DOCUMENTS

| | | | |
|---|---|---|---|
| 2,522,502 | 9/1950 | Clark | 210/149 |
| 4,306,966 | 12/1981 | Lucia | 210/149 |
| 4,869,820 | 9/1989 | Yee | 210/437 |

FOREIGN PATENT DOCUMENTS

| | | | |
|---|---|---|---|
| 2204250 | 11/1988 | United Kingdom. | |
| 8603687 | 7/1986 | WIPO. | |
| WO92/04960 | 4/1992 | WIPO | 210/437 |

*Primary Examiner*—Matthew O. Savage
*Attorney, Agent, or Firm*—Lerner, David, Littenberg, Krumholz & Mentlik

[57] ABSTRACT

Filtration apparatus for the purification of various oil products such as combustion oil, lubricating oil, hydraulic oil, or transformer oil is disclosed, including a housing, a rigid, hollow core mounted longitudinally within the housing, and filter paper wound around the hollow core so that the oil flows axially through the filter paper in the housing from a high pressure end to the lower pressure end, and in which passages extend between the interior of the hollow core and the filter paper and a valve is provided for establishing fluid communication between the interior of the hollow core and the low pressure end of the filter.

14 Claims, 2 Drawing Sheets

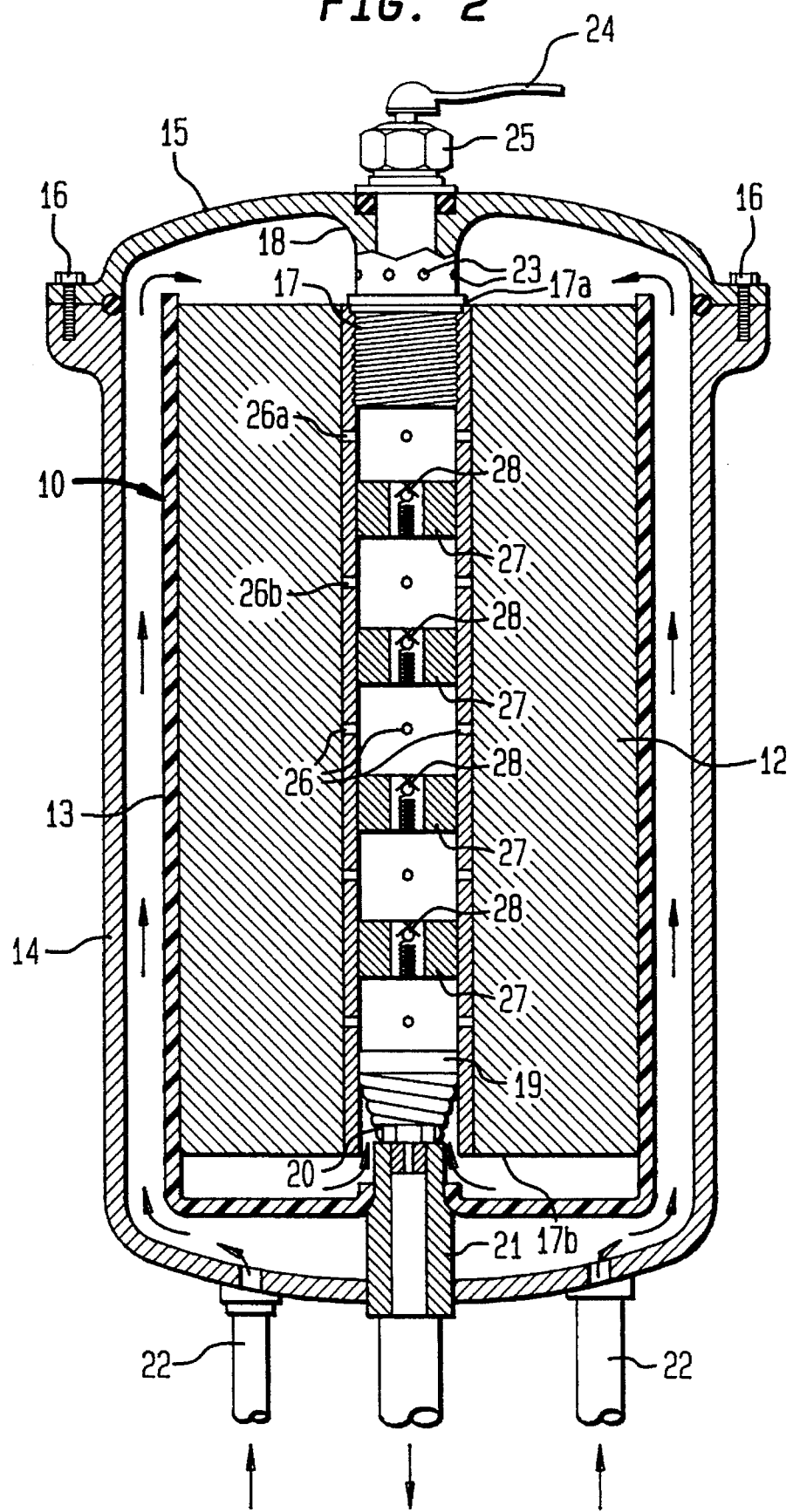

ARRANGEMENT FOR A FILTER FOR THE PURIFICATION OF OIL

TECHNICAL FIELD

The present invention concerns an arrangement for a filter for the purification of oil, for example combustion oil, lubricating oil, hydraulic oil or transformer oil from liquid and particulate impurities which are in suspension, said filter being formed of a filter paper, wound into a roll around a stiff core of a liquid-impermeable material, and a housing, surrounding the filter unit, of liquid-impermeable material which is arranged to guide the liquid flow essentially axially through the filter roll from a high pressure side to a low pressure side.

TECHNICAL BACKGROUND

GB 796,475 describes an oil filter which for a long time formed the market standard in the category of lubrication filters. The development in combustion engines has, at least for private cars and trucks, gone in a direction towards engines with higher performance and higher operating temperatures. The requirements on the lubrication oil's quality and the system for purification of the same have also increased accordingly. In many cases the problem is solved with the help of more frequent oil and filter changes. The high quality oil contains many chemical additives which make it expensive to produce and at the same time imply a load on the environment. Used lubrication oil is often destroyed by burning in plants having poor or no cleaning. The normal reason necessitating the change of lubrication oil is that the oil is saturated with fine particles which the engine's filter system is incapable of collecting.

The increased use of hydraulic oil for different systems and arrangements also brings with it a considerable load on the environment, for example when piston seals are damaged by particles in the oil, leading to leaks.

Another field of use for oil is as insulating fluid in transformers. Due to the occurrence of particles and moisture in the oil, arcing can occur in the fluid. The insulating fluid therefore has to be changed or filtered clean at regular intervals.

SE 450 650 describes an arrangement for filtering of combustion oil for diesel engines. The arrangement accomplishes an effective separation of particles and water droplets from the combustion oil but, due to the large flow resistance, this arrangement has a limited field of application.

Present filter arrangements lack the flexibility required to be effective at differing oil temperatures, viscosities and degrees of impurity.

TECHNICAL PROBLEM

An object of the present invention is therefore to achieve a filter arrangement which is more adaptable to different conditions of use than known filter arrangements. Another object is to achieve a highly effective filter arrangement for a broad spectrum of applications.

SOLUTION

This object is achieved according to the invention, in that the core is provided with an internal plug proximate the low pressure side of the filter roll, in that the core presents a number of radial passages between the core interior and the filter roll, and in that the core moreover is provided with at least one openable valve, with the help of which the interior of the core can be put in flow-connection with the filter roll's low pressure side.

The subsequent dependent claims describe different advantageous variants of the arrangement.

DESCRIPTION OF THE FIGURES

An embodiment of the invention will now be described in more detail with reference to the accompanying drawings, in which FIG. 1 schematically shows a vertical section of a filter arrangement according to a first embodiment of the invention, and FIG. 2 shows a variation of the filter arrangement depicted in FIG. 1.

PREFERRED EMBODIMENTS

Figure 1:
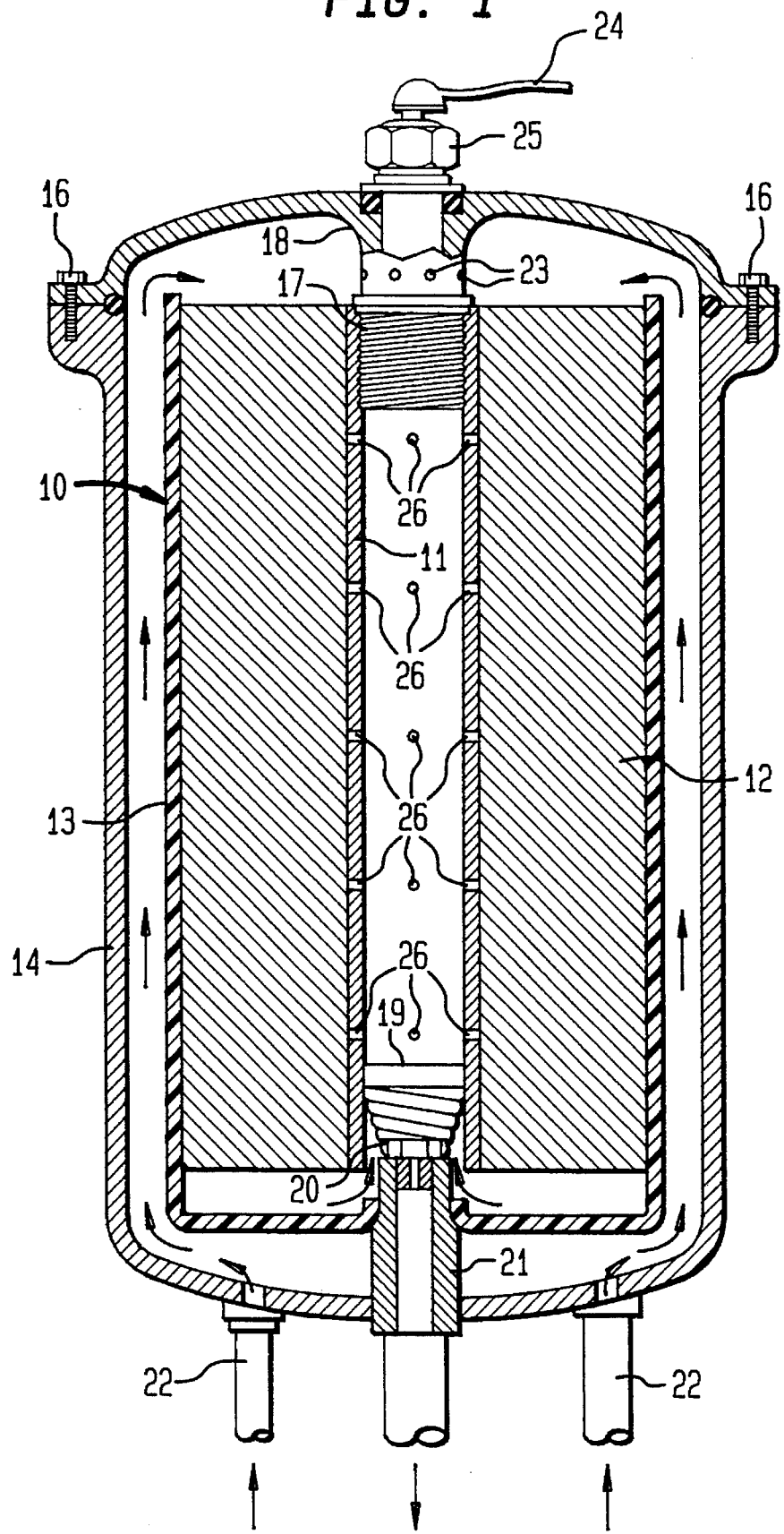

Both figures show a filter arrangement comprising a central filter insert 10, which presents a core 11 of oil-resistant material, around which cellulose paper is tightly wound into a roll 12. This roll is pressed into a filter holder bowl 13 which fits tightly against the roll's enveloping surface, but leaves free play at one end of the roll, which in the figure is the lower end. The other end of the roll is totally open.

The filter insert 10 is mounted inside a filter housing 14. The casing 14 comprises a cover 15, which is screwably tightenable by means of screws 16 in a cylindrical part. The core 11 of the filter insert 10 is screwed onto a centrally positioned sleeve 18 provided with external threads 17 and projecting from the inside of the cover 15. The opposite end of the insert 10 is supported by means of an end plug 19, a compression spring 20 and additionally a central opening in the filter holder bowl 13 against a pipe socket 21 directed towards the interior of the container. This pipe socket 21 connected tightly against the filter holder bowl 13 forms an outlet from the filter housing 14.

It is shown in FIG. 1 a connecting arrangement or connecting means is provided for connecting the low pressure end of the filter with the socket 21 or outlet. This connecting arrangement is formed between the bottom 37 of the bowl 13 and the lower end of the core. As shown in FIG. 1, the pipe 21 extends through the end portion of the and into the core such that an annular space is formed between the core and the pipe. The pipe includes a free open end positioned within said core that abuts the compression spring such that oil is guided from the low pressure side of the filtration means into said annular space, through the compression spring, and into the open end of the pipe to the outlet.

The housing 14 is provided with two inlet pipes 22, which open onto the outside of the filter housing bowl 13. Hereby a flow path is formed through the filter housing, which extends upwards in the figures, between the interior of the housing and the outside of the filter holder bowl to the filter housing cover. Here the flow reverses downwards and passes through the roll 12. At the bottom of the filter holder bowl 13 the flow direction changes radially inwards and exits out of the filter housing via the central pipe socket 21.

The above described flow path forms a primary flow path through the filter, which is capable of removing all types of coarse grain and fine grain particles from the lubricating oil. Moreover this filter is capable of absorbing possible water droplets in the oil. The primary flow path through the filter roll 12 presents a proportionately large resistance to flow.

The sleeve 18 is provided with internal passages 23, which are openable by means of adjusting device 25 operable via an electric cable 24. This adjustment device can be arranged to keep the passages into the interior of the core 11 open, until the oil reaches a particular temperature, or alternatively to open the passages 23 in case the fluid pressure on the filter's pressure side reaches a particular value. In this way a secondary flow path is formed via the core interior and a number of holes 26 bored radially through the core wall.

The adjusting device 25 can be a valve which is adjustable between first and second operation positions and visa versa. In said first operating position the entire oil passes axially through the filter. In the second operating position the oil can also flow radially into the filter via the passages 26.

FIG. 1 shows a variant of the invention where all the holes 26 are open to the roll 12. This variant can be used to advantage for filtering lubrication oil, in which the secondary flow path with proportionately low resistance is open for cold starting since the oil is cold and the viscosity is therefore high. Consequently the oil passes more easily and more quickly through the filter with a reduced degree of purification, until the temperature rises and the viscosity falls, whereby the passages 23 are closed to attain the full degree of purification. This variant is even applicable for purifying hydraulic or transformer oil, in which case one uses both the primary and the secondary flow paths in a first coarse purification stage. In the second stage the filter's maximum purification capacity is then used via the primary flow path only.

FIG. 2 shows a second variant of the invention where the core is divided axially by means if at least one valve plug 27. A plurality of sets of radial passages are provided in the hollow core. The sets of radial passages are separated apart from one another longitudinally along the hollow core and extend between the interior of the hollow core and the filtration means. Each of these valve plugs 27 is provided with an overflow valve 28 Each overflow valve 28 separates the plurality of sets of radial passages into an upstream set 26a between the end 17a of said hollow core and an upstream side of the respective overflow valve and a downstream set 26b between the end 17b of said hollow core and a downstream side of the respective overflow valve. The overflow valve means opens at a predetermined pressure differential pressure between the upstream and downstream sides of the overflow valve means to permit oil flow through the upstream set of plurality of passages to the downstream set. In this way one can thereby produce a stepwise increase or decrease of the number of open passages 26 in the core 11. This allows an extraordinarily good utilisation of the filter roll's purification capacity, which for example is shown in that dirt particles will be relatively evenly spread in the roll's axial direction.

The invention is not limited to the above described embodiment, many variations being imaginable within the scope of the following claims, For example the filter housing can be shaped differently than shown. The flow paths can be reversed from those described above. Furthermore the device for opening and closing of the secondary flow paths can be different than shown.

I claim:

1. Filtration apparatus for purification of oil, comprising:

a housing, having an inlet and an outlet;

a rigid hollow core with an interior longitudinally mounted in said housing, said core having first and second ends;

filtration means for filtering said oil mounted about said hollow core, said filtration means being formed of cellulose filter paper wrapped tightly into a roll about said core and having a high pressure end adjacent the second end of said core and a low pressure end adjacent the first end of said core, said roll having an outer periphery;

bowl means formed of liquid impermeable material substantially engaging the outer periphery of said roll having an end portion positioned adjacent the low pressure end of said filtration means for flowing said oil through said housing so that said oil flows axially through said filtration means from said high pressure end to said low pressure end and radially outwardly to said hollow core;

wherein said high pressure end communicates with said inlet;

means for connection said low pressure end of said filtration means with said outlet;

a plurality of sets of radial passages in said hollow core, said sets of radial passages being separated apart from one another longitudinally along said hollow core, said plurality of sets of radial passages extending between the interior of said hollow core and said filtration means;

plug means for closing the first end of said hollow core;

first valve means situated at said second end of said hollow core and adjacent the high pressure side of said filtration means for establishing fluid communication between said interior of said hollow core and said high pressure end of said filtration means; and at least one overflow valve means mounted within said hollow core and separating said plurality of sets of radial passages into an upstream set between said second end of said hollow core and an upstream side of said overflow valve means and a downstream set between the first end of said hollow core and a downstream side of said overflow valve means, wherein said overflow valve means opens at a predetermined pressure differential between the upstream and downstream sides of said overflow valve means to permit oil flow through said upstream set of plurality of passages to said downstream set of plurality of passages.

2. The filtration apparatus of claim 1 wherein said valve means is an electrically operated valve.

3. The filtration apparatus of claim 2 whereby said first valve means is adapted to be open until said oil reaches a predetermined temperature.

4. The filtration apparatus of claim 2 whereby said first valve means is adapted to be open until pressure of the oil on the high pressure side of said filter reaches a predetermined value.

5. Filtration apparatus for purification of oil, comprising:

a housing, including an inlet and an outlet;

a core assembly including at least a rigid substantially hollow core with an interior longitudinally mounted in said housing, said core having first and second ends, an end plug positioned within said hollow core for closing the first end of said core, said end plug having first and second surfaces opposing each other, wherein the first surface of the plug axially faces the first end of the core and the second surface of the plug axially faces the second end of the core, and a compression spring having first and second surfaces opposing each other, said spring being positioned within said core such that the first surface of the spring abuts the second surface of the plug;

filtration means for filtering said oil mounted about said substantially hollow core, said filtration means being formed of cellulose filter paper wrapped into a roll about said core and having a high pressure end adjacent the second end of said core and a low pressure end adjacent the first end of said core, said roll having an outer periphery;

bowl means formed of liquid impermeable material substantially engaging the outer periphery of said roll having an end portion positioned adjacent the low pressure end of said filtration means for flowing said oil through said housing so that said oil flows axially through said filtration means from said high pressure end to said low pressure end and radially inwardly or radially outwardly from to said substantially hollow core, wherein said high pressure end communicates with said inlet;

connecting means for connecting said low pressure end of said filtration means with said outlet;

a plurality of sets of radial passages in said substantially hollow core located between the second end of the core and the first surface of the plug, said sets of radial passages being separated apart from one another longitudinally along said substantially hollow core, said plurality of sets of radial passages extending between the interior of said substantially hollow core and said filtration means;

valve means situated at said second end of said substantially hollow core and adjacent the high pressure side of said filtration means for establishing fluid communication between said interior of said substantially hollow core and said high pressure end of said filtration means; and wherein said first end of said substantially hollow core is situated at said low pressure side of said filtration means and is supported within said filtration apparatus in such a manner that the second surface of the compression spring abuts said connecting means.

6. The filtration apparatus of claim 5, wherein said housing further comprises a cover with an interior surface, a sleeve extends outwardly from said cover, said sleeve having a free end and said valve means forming a part of said sleeve.

7. The filtration apparatus of claim 6, wherein said second end of said substantially hollow core is supported by said free end of said sleeve.

8. The filtration apparatus of claim 7, wherein said second end of said substantially hollow core engages said free end of said sleeve.

9. The filtration apparatus of claim 8, wherein said second end of said substantially hollow core threadably engages said free end of said sleeve.

10. The filtration apparatus of claim 9, wherein said valve means is adjustable between first and second operating positions, so that in said first operating position oil passes axially through said filtration means and in said second operating position a portion of said oil flows radially into said filtration means through said radial passage means from said interior of said substantially hollow core.

11. The filtration apparatus of claim 5, wherein said valve means is an electrically operated valve.

12. The filtration apparatus of claim 11, whereby said valve means is adapted to be open until said oil reaches a predetermined temperature.

13. The filtration apparatus of claim 11, whereby said valve means is adapted to be open until pressure of the oil on the high pressure side of said filter reaches a predetermined value.

14. The filtration apparatus of claim 5, wherein said connecting means includes a pipe extending through the end portion of said bowl means and into the first end of said core such that an annular space is formed between the core and the pipe, and wherein said pipe includes a free open end positioned within said core that abuts the second end of said compression spring, whereby oil is guided from the low pressure side of the filtration means into said annular space, through said compression spring, and into the open end of the pipe to said outlet.

* * * * *

UNITED STATES PATENT AND TRADEMARK OFFICE
CERTIFICATE OF CORRECTION

PATENT NO. : 5,484,523
DATED : January 16, 1996
INVENTOR(S) : Aegir Björnsson

It is certified that error appears in the above-indentified patent and that said Letters Patent is hereby corrected as shown below:

Column 2, line 44, after the words "portion of the" insert -- bowl 13 --.

Column 3, line 32, change "if" to read -- of --.

Column 3, line 38, after the words "with an overflow valve 28" insert a period.

Column 4, line 18, change "connection" to read -- connecting --.

Column 5, line 15, change "from to said" to read -- from said --.

Signed and Sealed this

Fourteenth Day of May, 1996

Attest:

BRUCE LEHMAN

*Attesting Officer*     *Commissioner of Patents and Trademarks*